United States Patent [19]
Brotz et al.

[11] 3,963,658
[45] June 15, 1976

[54] LUBRICANT FOR POLYVINYL CHLORIDE MATERIALS

[75] Inventors: Walter Brotz, Gersthofen; Günther Illmann, Stadtbergen; Alfred Riedel, Gersthofen; Friedrich Zinnert, Aystetten, all of Germany

[73] Assignee: Hoechst Aktiengesellschaft, Frankfurt am Main, Germany

[22] Filed: Mar. 18, 1975

[21] Appl. No.: 559,519

[30] Foreign Application Priority Data
Mar. 22, 1974 Germany............................ 2413827

[52] U.S. Cl............................................ 260/28.5 D
[51] Int. Cl.²......................................... C08L 91/00
[58] Field of Search................................ 260/28.5 D

[56] References Cited
UNITED STATES PATENTS
3,542,710    11/1970    Glatti.................... 260/28.5 D X
3,575,906    4/1971    Kuhne et al.............. 260/28.5 D X

*Primary Examiner*—Lewis T. Jacobs
*Attorney, Agent, or Firm*—Connolly and Hutz

[57] ABSTRACT

The invention is concerned with novel modified candelilla waxes which are obtained by treating natural candelilla wax with magnesium, calcium, barium, zinc or aluminium hydroxide to such an extent that the product has substantially no acid number and a saponification number of from 5 to 20 units below that of the starting wax. The modified waxes of the invention do not, in contrast to natural wax, render transparent PVC materials turbid during their processing, while the good properties of the natural lubricant remain unchanged.

1 Claim, No Drawings

LUBRICANT FOR POLYVINYL CHLORIDE MATERIALS

As most natural waxes candelilla wax is an excellent lubricant for PVC. Its compatitility in PVC is very good, which can be seen from the short plasticizing and long operating times without decomposition and sticking. Moreover it does not during processing exsude on the hot metal surfaces of the machine thus forming a layer. Candelilla wax is not suitable, however, for the processing of transparent PVC materials such as bottles, plates and profiles owing to the fact that it renders the molded articles very turbid.

The present invention was concerned with the problem to modify candelilla wax chemically so that it does no longer render turbid the PVC materials while mostly preserving its good lubricating properties.

The present invention consequently provides a process for preparing a lubricant based on candelilla wax, not rendering transparent polyvinyl chloride materials turbid during processing, which comprises saponifying candelilla wax by treating it with calcium, barium, zinc, magnesium or aluminium hydroxide to such a degree that a product is obtained having practically no acid number and a saponification number of from 5 to 20 units below that of the wax used as starting material.

It was surprising and unexpected that a candelilla wax modified according to the process of the invention had the desired properties, since a similar treatment of an other natural wax, i.e. of carnauba wax did not improve its properties, i.e. modified as well as non-modified carnauba wax, when used as a lubricant, render turbid PVC materials.

The starting material used for the process of the invention is candelilla wax, which shows characteristic data varying within wide limits, since it is a natural product. The acid and saponification numbers of a commercial candelilla wax, for example, may vary in the range of from about 12 to 22 and of from about 43 to 65, respectively. The absolute values of said characteristic numbers are not substantial, however, in order to obtain a lubricant having the desired properties, but it is of great importance to carry out the reaction such that the resultant product practically has no acid number and a saponification number of from 5 to 20 units below that of the starting material.

The saponification of the candelilla wax is effected as follows: The quantity of hydroxide required from saponifying the free carboxyl groups and the ester groups, calculated from the acid number and the saponification number is added to the molten wax at a temperature of about 120°C and the whole is stirred until the reaction is terminated. Suitable hydroxides are preferably alkaline earth hydroxides such as calcium hydroxide, barium hydroxide and magnesium hydroxide, moreover zinc hydroxide and aluminium hydroxide. The reaction with calcium hydroxide is preferred. It is likewise possible to saponify firstly with an alkali hydroxide, especially with an aqueous solution of potassium hydroxide (of from 2 to 5 percent) and to react the alkali soap with the aqueous solution of a salt of the corresponding metal, for example a chloride, sulfate, nitrate or acetate, such as calcium chloride. It is also possible to saponify with mixtures of the metal hydroxides or to effect the aforesaid double reaction with mixtures of salts.

The modified candelilla waxes obtained by one of the aforesaid processes are slightly grey, hard substances having a dropping point of from 85° to 105°C, a saponification number depending on the starting material of from about 23 to 60 and practically having no free carboxyl groups. They may readily be ground to give powders. Used in a guantity of from 0.2 to 3.0, preferably of from 0.5 to 2.0 % by weight, they are excellent lubricants in the calendering, extruding or injection molding of PCV materials, especially of such which must meet the requirements of a high transparency, owing to the fact that they do not render turbid the PVC materials even when used in large amounts. If products are used having an acid number and/or a saponification number outside the limits found according to the invention for example those being completely neutralized and completely or substantially saponified, an optimum transparency is no longer obtained.

The following examples illustrate the invention.

EXAMPLE 1

(According to the Invention)

1000 g of candelilla wax having an acid number of 20 and a saponification number of 56 were molten at 120°C. 50 g of calcium hydroxide were introduced while stirring into the molten wax and stirring was continued for 5 hours while maintaining the temperature. A homogeneous mixture was obtained, solidifying after cooling giving a slightly grey wax material. The product had an acid number of 0, a saponification number of 51 and a dropping point of 110°C.

EXAMPLE 2

(Comparative Product)

200 g of the candelilla wax used in example 1 were molten. 2000 g of an aqueous solution of potassium hydroxide (2 %) were introduced into the melt within 1 hour while stirring and maintaining the temperature at 90°C. A solution of 80 g of calcium chloride in 200 ml of water was introduced thereto while stirring. The whole was allowed to react for 1 hour at 90°C and cooled subsequently. The precipitated calcium salt was filtered off with suction, washed with water and dried. The wax obtained had a dropping point of 89°C/90°C; it neither had an acid number nor a saponification number.

EXAMPLES 3 to 8

The lubricating properties of the wax compositions were determined in usual manner with a two roll mill by plastifying 200 g of a suspension polyvinyl chloride having a K value of 65 with 2 g of tin stabilizer and 1 g (0.5 %) of the substance wax to be tested and rolling until the sheet decomposed.

In order to determine the transparency a mixture of 200 g of suspension PVC having a K value of 65,3 g of tin stabilizer and 2 g (1 %) of the substance to be tested were plasticized in the same manner for ten minutes, whereupon the rolled sheet was compressed on a heatable press giving sheets being 2 mm thick. The weakening of a light ray of a wave length of 741 nm expressed in % of the unfiltered ray when passing through the steets is a measure for the transparency.

The results are indicated in the following table. It can be seen from examples 7 and 8 that the properties of carnauba wax are not improved by the modification process according to the invention.

TABLE

| Example No. | starting wax | Lubricant used modified with | acid number | saponification number | Time of rolling/min. (0.5 % of lubricant) | Transparency(%) (1 % of lubricant) |
|---|---|---|---|---|---|---|
| 3*) | candelilla | — | 20 | 56 | 85 | 52 turbid |
| 4*) | candelilla | Ca(OH)$_2$ according to example 2 | 0 | 0 | 60 | 69 slightly turbid |
| 5) | candelilla | Ca(OH)$_2$ according to example 1 | 0 | 38 | 65 | 82 nearly transparent |
| 6) | candelilla | Ca(OH)$_2$ according to example 1 | 0 | 51 | 60 | 87 transparent |
| 7*) | carnauba | — | 6 | 75 | 75 | 5 turbid |
| 8*) | carnauba | Ca(OH)$_2$ according to example 1 | 0 | 50 | 73 | 5 turbid |

*) Comparative examples

What is claimed is:

1. Transparent composition of matter comprising
a. polyvinyl chloride and
b. 0.2 to 3.0 % by weight, calculated on the weight of component a), of a modified candelilla wax as lubricant obtained by saponifying candelilla wax by treating it with calcium, barium, magnesium, zinc or aluminium hydroxide to such a degree that a product is obtained having substantially no acid number and having a saponification number 5 to 20 units below that of the starting wax.